United States Patent
Uomori et al.

(10) Patent No.: US 7,423,658 B1
(45) Date of Patent: Sep. 9, 2008

(54) IMAGE PROCESSOR, METHOD OF PROVIDING IMAGE PROCESSING SERVICES AND ORDER PROCESSING METHOD

(75) Inventors: Kenya Uomori, Osaka (JP); Atsushi Morimura, Nara (JP); Takasuke Sonoyama, Kyoto (JP); Shuhei Taguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1670 days.

(21) Appl. No.: 09/714,283

(22) Filed: Nov. 17, 2000

(30) Foreign Application Priority Data

Nov. 19, 1999 (JP) ................................. 11-329853

(51) Int. Cl.
G09G 5/00 (2006.01)
(52) U.S. Cl. ...................................... 345/660; 345/667
(58) Field of Classification Search ................. 345/624, 345/629, 634, 660, 667, 670; 348/135–137, 348/581
See application file for complete search history.

(56) References Cited

U.S. PATENT DOCUMENTS

| | | | |
|---|---|---|---|
| 4,653,104 A | | 3/1987 | Tamura |
| 5,317,508 A | * | 5/1994 | Okamoto et al. ................ 704/1 |
| 5,331,419 A | * | 7/1994 | Yamada et al. ................. 348/64 |
| 5,351,966 A | * | 10/1994 | Tohyama et al. ............... 463/2 |
| 5,583,977 A | * | 12/1996 | Seidl ........................ 345/619 |
| 5,742,294 A | * | 4/1998 | Watanabe et al. ............. 345/672 |
| 5,937,213 A | * | 8/1999 | Wakabayashi et al. ......... 396/50 |
| 6,262,763 B1 | * | 7/2001 | Totsuka et al. .............. 348/135 |
| 6,304,855 B1 | * | 10/2001 | Burke .......................... 705/27 |
| 6,396,495 B1 | * | 5/2002 | Parghi et al. ................ 345/426 |
| 6,552,744 B2 | * | 4/2003 | Chen ........................ 348/218.1 |
| 6,556,243 B1 | * | 4/2003 | Dotsubo et al. ............. 348/231.2 |
| 6,806,905 B1 | * | 10/2004 | Morimoto et al. ......... 348/333.02 |

FOREIGN PATENT DOCUMENTS

| | | |
|---|---|---|
| CN | 1116703 A | 2/1996 |
| JP | 01-203908 | 8/1989 |
| JP | 01-203908 A | 8/1989 |
| JP | 02-001514 A | 1/1990 |
| JP | 03-002505 A | 1/1991 |

(Continued)

OTHER PUBLICATIONS

K. Hattori et al., "Handy Rangefinder for Active Robot Vision", IEEE International Conference on Robotics and Automation, pp. 1423-1428, 1995.

(Continued)

Primary Examiner—Motilewa Good-Johnson
(74) Attorney, Agent, or Firm—McDermott Will & Emery LLP

(57) ABSTRACT

An apparatus for processing an image, containing the 3D positional information of an object, realizes highly user-friendly and entertaining functions. The object image is presented on a display panel. When the user specifies a point on the panel screen, a real size of the object at the specified point is obtained in accordance with the 3D positional information. Then, a scale image substantially representing the real size obtained is generated, combined with the object image and a synthesized image is presented. The user is allowed to freely change the direction or location of the scale image.

24 Claims, 13 Drawing Sheets

FOREIGN PATENT DOCUMENTS

| | | |
|---|---|---|
| JP | 04-131711 | 12/1992 |
| JP | 05-026622 | 2/1993 |
| JP | 05-045125 | 2/1993 |
| JP | 06-44358 | 2/1994 |
| JP | 07-192147 | 7/1995 |
| JP | 09-159413 | 6/1997 |
| JP | 10-104715 | 4/1998 |
| JP | 11-184453 | 7/1999 |
| JP | 11-232537 | 8/1999 |
| JP | 11-305295 A | 11/1999 |
| WO | WO 99/61948 A | 12/1999 |

OTHER PUBLICATIONS

R. Ishiyama et al., "A Range Finder for Human Face Measurement", Technical Report of The Institute of Electronics, Information and Communication Engineers, pp. 35-42, Jun. 1999.

Notice of Reasons of Rejection, Patent Application No. 2000-350931 Mailing Date: Apr. 2, 2002.

Saji, Hitoshi et al.: "Measuring Three-Dimensional Shapes of a Moving Human Face Using Photometric Stereo Method with Two Light Sources and Slit Patterns," IEICE Transactions on Information and Systems, Information & Systems Society, Tokyo, Japan, Aug. 1997, vol. E80-D, No. 8, pp. 795-801.

* cited by examiner

IMAGE PROCESSOR, METHOD OF PROVIDING IMAGE PROCESSING SERVICES AND ORDER PROCESSING METHOD

BACKGROUND OF THE INVENTION

The present invention generally relates to image processing technology, and more particularly relates to a technique of processing an image by utilizing information about the three-dimensional position of an object.

FIG. 8 illustrates a basic arrangement for a rangefinder that can capture a range image (or depth image). The rangefinder shown in FIG. 8 pertains to the art closely related to the present invention and is disclosed by us in Japanese Patent Application No. 11-144097, which is hereby incorporated by reference. As shown in FIG. 8, the rangefinder includes camera 51, light sources 52a and 52b, light source controller 55 and distance calculator 56. In response to a vertical sync signal supplied from the camera 51, the light source controller 55 gets each of the light sources 52a and 52b alternately flashed. The distance calculator 56 generates a range image from an image captured by the camera 51.

FIG. 9A is a perspective view illustrating exemplary configurations for the light sources 52a and 52b. As shown in FIG. 9A, flash lamps 57 and 58 such as xenon lamps are vertically stacked in the light sources 52a and 52b, respectively. Reflectors 59 and 60 are placed behind these lamps 57 and 58, respectively, so that the range of the light reflected off from one of these reflectors 59 and 60 horizontally shifts from that of the light reflected off from the other. FIG. 9B is a plan view of the light sources 52a and 52b shown in FIG. 9A. As shown in FIG. 9B, the light sources 52a and 52b radiate, or project, light beams within the ranges A and B, respectively. In the illustrated example, the xenon lamps have so small emissive portions that these lamps can be virtually regarded as point light sources in the plan view. Also, the light sources 52a and 52b are vertically spaced apart from each other by about 1 cm. Accordingly, the light may be regarded as being emitted from almost a point.

Hereinafter, the operating principle of the rangefinder shown in FIG. 8 will be described with reference to FIGS. 10 through 13.

FIG. 10 schematically illustrates exemplary light patterns that have been radiated from the light sources 52a and 52b shown in FIG. 9. In FIG. 10, the solid lines La and Lb represent the brightness on a virtual screen Y, on which the light beams have been projected from the light sources 52a and 52b. The higher the solid lines La and Lb in the direction indicated by the arrow in FIG. 10, the brighter the light projected. As can be seen from FIG. 10, the light projected from each of these light sources 52a and 52b is intensest, or brightest, on the center axis of the projection range and gets gradually weaker, or darker, toward the edges of the range. A distribution like this results from the disposition of the semi-cylindrical reflectors 59 and 60 behind the flash lamps 57 and 58, respectively. And depending on which directions these reflectors 59 and 60 face, the light beams projected from the light sources 52a and 52b may or may not partially overlap with each other.

FIG. 11 is a graph illustrating a relationship between the angle φ of the projected light as measured in the direction H shown in FIG. 10 and the light intensity. In this case, the direction H is defined as a direction in which an arbitrary plane S, including the respective center of the light source and lens, and the virtual screen Y intersect with each other. The angle φ is an angle formed by the light, which has been projected onto the XZ plane, with the X-axis. As shown in FIG. 11, a range α of the light pattern projected from one of the light sources 52a and 52b through the object's space has relatively bright and relatively dark parts on right- and left-hand sides of the light source 52a or 52b, respectively. Conversely, the range α of the light pattern projected from the other light source 52b or 52a through the object's space has relatively dark and relatively bright parts on right- and left-hand sides of the light source 52b or 52a, respectively. It should be noted that the light patterns shown in FIG. 11 change in the height direction (i.e., the Y direction). In other words, the patterns are changeable depending on the level at which the plane including the centers of the light sources and lens is located.

FIG. 12 is a graph illustrating a relationship between the angle φ of the projected light and the light intensity ratio in the range α shown in FIG. 11. As shown in FIG. 12, there is a substantially linear relationship between the light intensity ratio and the angle φ in the range α.

To measure the distance of an object, two types of light patterns should be alternately projected in advance onto a plane standing vertically at a predetermined distance from the light source and light beams reflected from the plane should be received and imaged at the camera 51. A relationship between the light intensity ratio and the angle of the projected light such as that shown in FIG. 12 should be obtained in advance for each Y coordinate (corresponding to a Y coordinate on the CCD). And the light sources 52a and 52b should be disposed so that a line connecting the center of the camera lens to the light sources 52a and 52b is parallel to the X-axis of the CCD imaging plane. In that case, the distance of the object can be estimated accurately based on the data representing the relationships between the light intensity ratios and angles of the projected light associated with the respective Y coordinates obtained beforehand.

Now, take a look at the point P shown in FIG. 8. First, the intensity ratio of the light beams projected from the light sources 52a and 52b onto the point P is obtained from the image captured by the camera 51. And the angle φ corresponding to the point P as viewed from the light sources 52a and 52b can be derived from the resultant intensity ratio by reference to the relationship shown in FIG. 12 associated with the Y coordinate of the point P. Also, the angle θ formed by a visual axis, which extends from the center of the camera 51 to the point P, with the X-axis can be obtained based on the coordinates of a pixel associated with the point P and various camera parameters including coordinates of the optical center of the lens system. Then, the distance of the point P is estimated by the triangulation technique using the two angles obtained θ and φ and a baseline length D, i.e., the distance between the position of the light sources 52a and 52b and the optical center of the camera 51.

Suppose the optical center of the camera 51 is defined as the origin O of the coordinate system; the optical axis of the camera 51 as the Z-axis thereof; horizontal and vertical directions as the X- and Y-axes thereof; an angle formed by a visual axis extending from the light sources 52a and 52b to the point P with the X-axis as φ; an angle formed by a visual axis extending from the camera 51 to the point P with the X-axis as θ; and the coordinates of the light sources 52a and 52b are (0, −D) (i.e., the baseline length is D). Then, the depth Z of the point P is given by $$Z = D \tan\theta \tan\phi / (\tan\theta - \tan\phi)$$

Alternatively, all of the three-dimensional coordinates (X, Y, Z) of the point P may be calculated by the following equations using the angle ω shown in FIG. 13:

$$X = Z/\tan\theta$$

$$Y = Z/\tan\omega$$

Furthermore, an ordinary color image can also be obtained by adding and averaging the images formed by flashing the light sources 52a and 52b. Accordingly, an image containing three-dimensional (3D) positional information can be captured by using the arrangement shown in FIG. 8.

However, even though it is now technically possible to capture an image with 3D positional information in this manner, the technique per se does not automatically allow each and every maker to market attractive, potentially big-hit products. Accordingly, in developing consumer electronic products, it is very important for the makers to add highly convenient and entertaining functions to the products by taking advantage of the technique.

SUMMARY OF THE INVENTION

It is therefore an object of the present invention to provide highly user-friendly and interesting functions by utilizing 3D positional information of an object in image processing.

Specifically, an inventive image processor includes: a display for presenting an image of an object thereon; and an image synthesizer for generating a scale image, representing a substantially real size, at a position specified on the image presented on the display in accordance with 3D positional information of the object and for combining the scale image with the image of the object. A synthesized image, obtained by combining the scale image with the object image, is presented on the display.

According to the present invention, a scale image, representing a substantially real size, is combined at a specified position with an image originally presented on the display so that a synthesized image is presented on the display. Thus, the user can know a real size of the object imaged quickly on looking at the synthesized image presented.

In one embodiment of the present invention, the processor may further include: an imaging section for capturing the object image containing the 3D positional information; and a range image generator for drawing the 3D positional information from the image captured by the imaging section. The image synthesizer preferably generates the scale image in accordance with the 3D positional information obtained by the range image generator. More specifically, the imaging section preferably includes light-emitting means for projecting light with a predetermined radiation pattern onto the object and captures the object image containing the 3D positional information by receiving part of the light that has been projected onto, and then reflected from, the object.

In an alternative embodiment, the processor may further include an imaging section having an automatic or manual focusing controller. The image synthesizer preferably generates the scale image by using data, which represents a distance of the object and is obtained by the automatic or manual focusing controller, as the 3D positional information.

In still another embodiment, the processor may further include input means that is so constructed as to allow a user to externally input the specified position. Specifically, the input means may be a touch panel formed on the surface of the display, a penlike pointing device so constructed as to allow the user to specify arbitrary coordinates on the surface of the display or a cursor key, mouse or press button that allows the user to move a cursor presented on the display and to specify coordinates of the cursor.

Another inventive image processor includes: a display for presenting an image of an object thereon; and an image synthesizer for combining respective images of multiple objects together in accordance with 3D positional information of the objects so that at least one of the object images is scaled up or down according to a desired size relationship. A synthesized image, obtained by combining the multiple images together, is presented on the display.

According to the present invention, multiple images are combined together after at least one of the images has been appropriately scaled up or down according to a user defined size relationship (e.g., to meet an actual size relationship) and then a resultant synthesized image is presented on the display. Thus, the user can combine an image of the object with another background image with their scales matched. In this manner, the user can quickly watch a virtual image of the object on his or her favorite non-real background.

In one embodiment of the present invention, the image synthesizer may combine the image of one of the objects, which has been separated from a background image, with another background image. In this particular embodiment, the image synthesizer preferably cuts out an image portion, which is made up of pixels at respective locations associated with distances falling within a predetermined range, as the separated object image from the image.

In an alternative embodiment, the processor may further include: an imaging section for capturing the object images containing the 3D positional information; and a range image generator for drawing the 3D positional information from the images captured by the imaging section. The image synthesizer may combine the images together in accordance with the 3D positional information obtained by the range image generator. More specifically, the imaging section preferably includes light-emitting means for projecting light with a predetermined radiation pattern onto the at least one object and captures the object image containing the 3D positional information by receiving part of the light that has been projected onto, and then reflected from, the object.

In still another embodiment, the processor may further include an imaging section having an automatic or manual focusing controller. The image synthesizer may combine the images together by using data, which represents distances of the objects and is obtained by the automatic or manual focusing controller, as the 3D positional information.

Still another inventive image processor includes a display for presenting an image of an object thereon and an image synthesizer for generating an image, representing the object substantially in its real size when presented on the display, by scaling the image up or down in accordance with 3D positional information of the object. The image, representing the object substantially in its real size, is presented on the display.

An inventive method of providing image processing services for a user includes the steps of: receiving an image, containing 3D positional information of an object, and his or her specified image processing mode from the user; drawing the 3D positional information from the object image received; performing image processing on the received image in the specified image processing mode in accordance with the 3D positional information drawn; and sending out image data obtained by the image processing to the user.

An inventive order processing method includes the steps of: receiving an instruction, which specifies a type of a product, from a user; sending out an image, containing 3D positional information of the product of the specified type, to the user; and receiving an order for the product, along with information specifying his or her desired size of the product, from the user.

DESCRIPTION OF THE PREFERRED EMBODIMENTS

Hereinafter, preferred embodiments of the present invention will be described with reference to the accompanying drawings.

As used herein, a "range image" is an image containing data about either distances associated with respective pixels as measured from a camera or depth values in the three-dimensional coordinate system. Each of these distances corresponds to a spherical coordinate r of the spherical coordinate system $(r, \theta, \phi)$, while each of the depth values corresponds to an orthogonal coordinate z of the orthogonal coordinate system $(x, y, z)$. In a first embodiment of the present invention, the spherical coordinate r will be used. On the other hand, the orthogonal coordinate z will be used in a second embodiment of the present invention. It should be noted, however, that the spherical coordinate system $(r, \theta, \phi)$ and orthogonal coordinate system $(x, y, z)$ are mutually convertible bidirectionally. Also, by using a pixel location with two-dimensional coordinates $(x, y)$ on a CCD, spherical coordinates $(r, \theta, \phi)$ and orthogonal coordinates $(x, y, z)$ can be easily obtained from r and z, respectively, through three-dimensional geometric computations.

Embodiment 1

Figure 1:
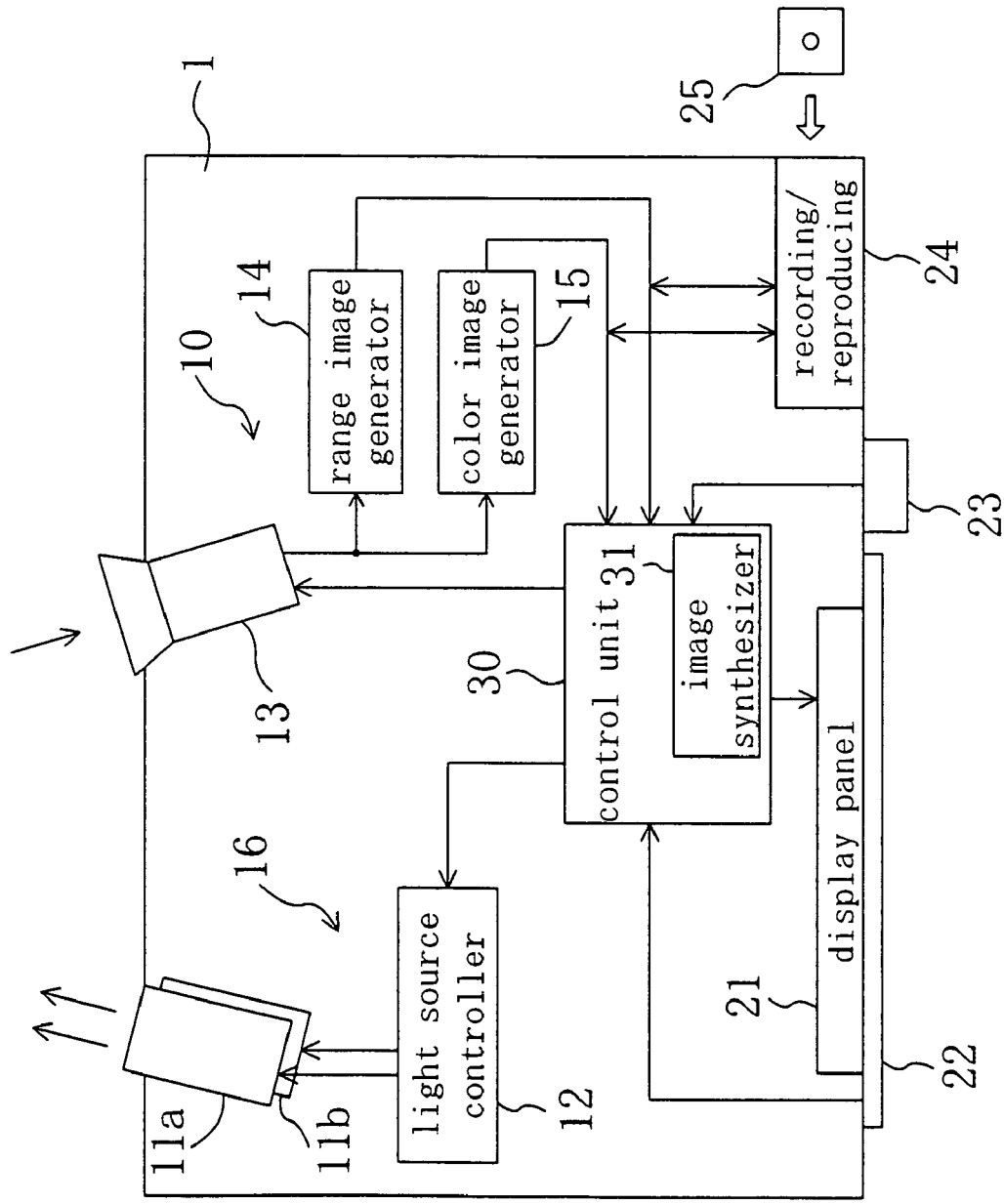
FIG. 1 is a block diagram illustrating an arrangement for a geometric measuring camera as an exemplary image processor according to first and second embodiments of the present invention.

FIG. 1 illustrates an arrangement for a geometric measuring camera as an exemplary image processor according to the first embodiment. As shown in FIG. 1, the camera includes casing 1, first and second flash lamps 11a and 11b, light source controller 12, imager 13, range image generator 14 and color image generator 15. The first and second flash lamps 11a and 11b are used as respective light sources. The light source controller 12 controls flashing of the first and second flash lamps 11a and 11b. The range image generator 14 generates a range image from the image captured by the imager 13. The range image contains data about the distances associated with respective pixel locations on the image as measured from the camera. And the color image generator 15 generates a normal color image from the image captured by the imager 13. The first and second flash lamps 11a and 11b and light source controller 12 together constitutes light-emitting means 16. And the imager 13 and light-emitting means 16 together makes up an imaging section 10. The light-emitting means 16 is removable from the body, i.e., the imaging section 10.

The camera further includes display panel 21, touch panel 22, shutter release 23 and recording/reproducing section 24. The display panel 21 is provided to present an image thereon. The touch panel 22 is formed on the surface of the panel 21. And the recording/reproducing section 24 writes or reads out the range image or color image onto/from a storage medium 25.

The camera further includes a control unit 30 with a built-in image synthesizer 31. Responsive to an output signal of the shutter release 23, the control unit 30 not only controls the operations of the light source controller 12 and imager 13 but also provides the input color image to the display panel 21 so that the image will be presented thereon. The image synthesizer 31 combines a scale image, representing a real size at a specified position on the image, with the image itself.

In the camera shown in FIG. 1, the imager 13 can capture an image, including 3D positional information, as in the example described in the background section. In addition, according to this embodiment, by using the range image, generated by the range image generator 14, as the 3D positional information, a scale image, representing a substantially real size, can be presented on the panel 21 along with a normal color image.

Figure 2:
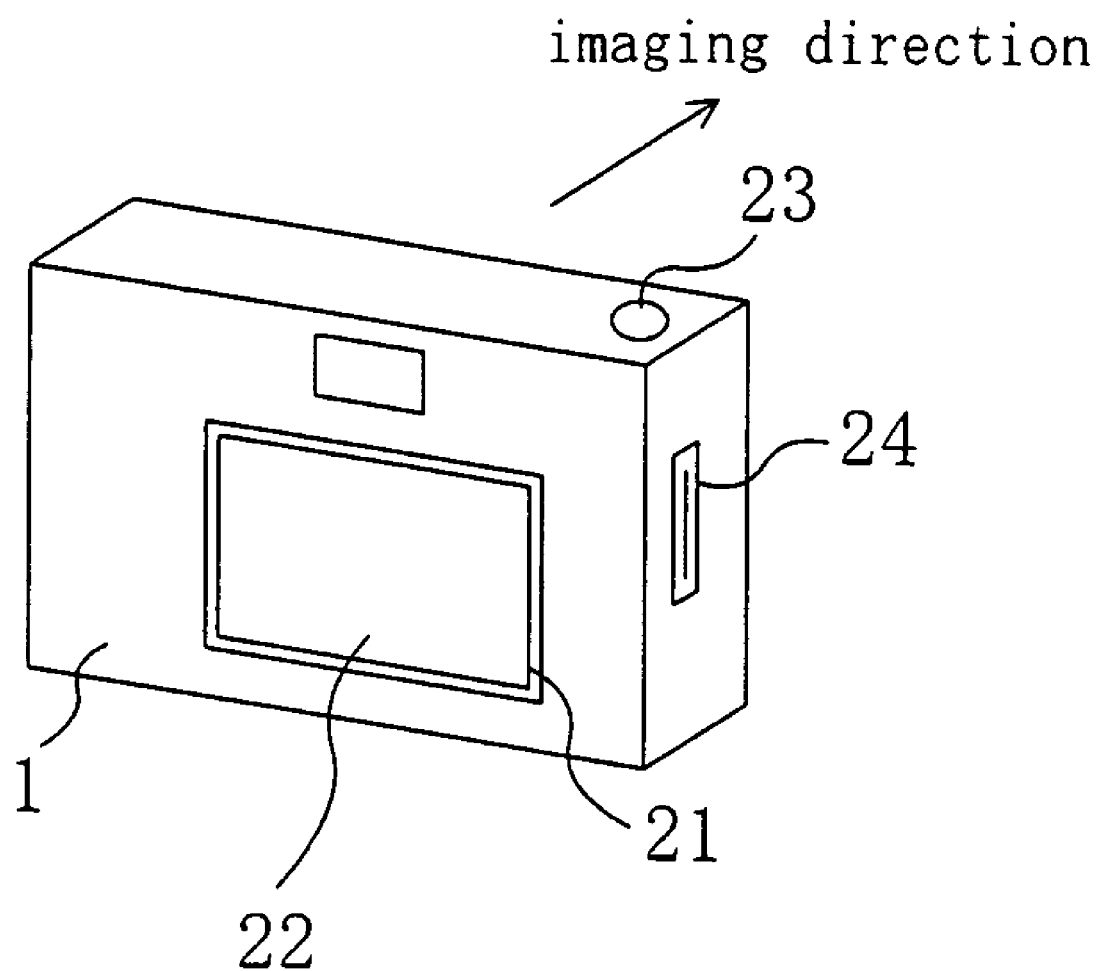
FIG. 2 is a perspective view illustrating the back appearance of the camera shown in FIG. 1.

FIG. 2 is a perspective view schematically illustrating the back appearance of the camera shown in FIG. 1. As shown in FIG. 2, the display and touch panels 21 and 22 are stacked in this order on the backside of the camera 1. By manipulating the touch panel 22, the user can specify his or her desired position on the image, where he or she wants the scale image to be presented on the display panel 21, so that he or she can know a real size of the object.

Hereinafter, it will be described with reference to FIGS. 3A through 3F how the geometric measuring camera of the first embodiment operates in such a manner as to present a scale image in accordance with the user's instructions.

Figure 3A:
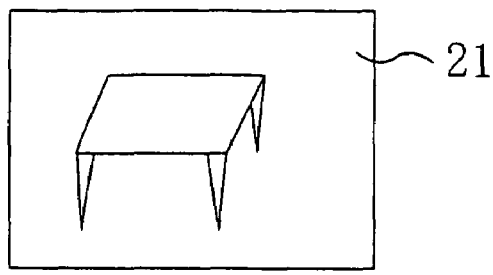
FIGS. 3A through 3F illustrate how the camera of the first embodiment operates.

First, as shown in FIG. 3A, the user takes a picture of an object (e.g., a desk placed in a room in the illustrated example) with the camera of this embodiment. In this case, the image generated includes 3D positional information of respective parts of the desk. Then, the user has a color image of the desk presented on the display panel 21.

Figure 3D:
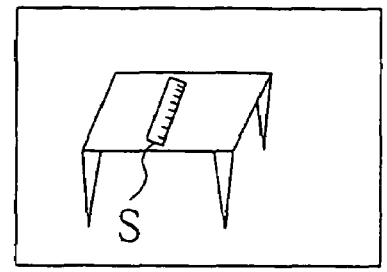
Figure 3B:
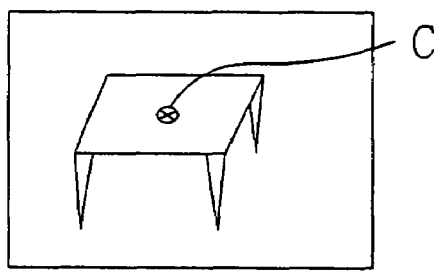

Next, as shown in FIG. 3B, the user specifies his or her desired position on the image, at which the real size should be represented by the scale image. The user may select a scale display mode for the display panel 21 by turning ON a mode switch provided for the body of the camera, for instance.

Then, the user may specify a position C (i.e., a point on the upper surface of the desk in the illustrated example) using the touch panel 22 while watching the screen.

In response, the image synthesizer 31 calculates a real size for the specified position C based on the range image thereof, generates a scale image representing the real size obtained and then combines the scale image with the color image. As a result, the scale image S, representing the real size of the upper surface of the desk, is presented at the specified position C as shown in FIG. 3C. In the illustrated example, the scale image S is an image representing a ruler with a scale.

The real size may be calculated in the following manner. Specifically, based on a Euclidean distance between the specified position C with a set of three-dimensional coordinates and the center of the camera lens with a different set of three-dimensional coordinates, the distance L between the camera and the object is derived. The real length $P_x$ represented by each pixel on the screen for the specified position C is given by $$P_x = L/f \cdot S_x/N_x$$

where f is the focal length of the camera, $S_x$ is a CCD size of the camera and $N_x$ is the number of horizontal active pixels in the CCD. Accordingly, the number $N_p$ of on-screen pixels equivalent to a real length X is given by $$N_p = X/P_x$$

Thus, the scale image S with a length represented by the pixel number $N_p$ is combined with letters L representing the real length X (e.g., 20 cm in the illustrated example) at the specified position C.

Figure 3E:
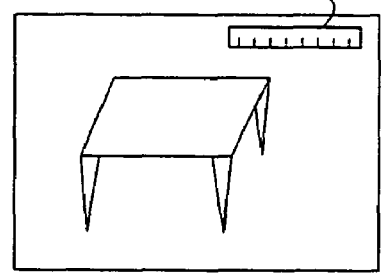
Figure 3C:
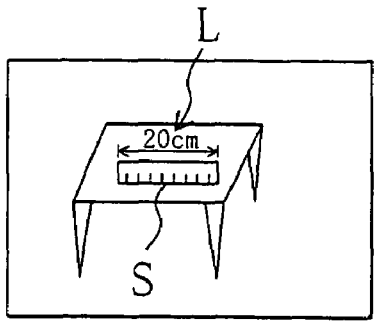

Also, as shown in FIGS. 3D and 3E, the user may change the direction and display position of the presented scale image S by manipulating the touch panel 22. It should be noted that when the far end of the scale image S presented is directed toward the depth of the screen as shown in FIG. 3D, the distance L between the camera and the object changes gradually. Accordingly, the scale image S will have a non-even (i.e., diminishing) scale in that case. Optionally, the processor may also be constructed so that the user can select an arbitrary one of multiple scale images S with mutually different scales.

Figure 3F:
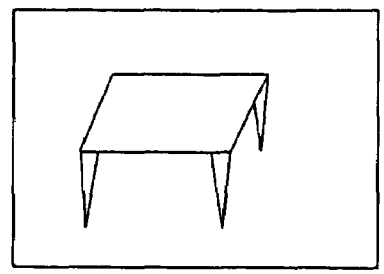

If the user wants to remove the scale image S from the screen, then he or she cancels the scale display mode by turning the mode switch OFF, for example. As a result, the scale image S disappears from the screen and only the original color image is left as shown in FIG. 3F.

In this manner, according to this embodiment, the user can easily know a real size of an imaged object by reference to the scale image, representing the real size on the screen, while watching the image. Thus, on looking at an image of an object, e.g., a fish on a fishhook or a finding that has been dug up in some remains, the user can know its real size quickly and easily without placing any size reference object beside it. Also, if the camera of this embodiment is used as a security camera, then the user can easily identify a body size of a criminal imaged.

Figure 4:
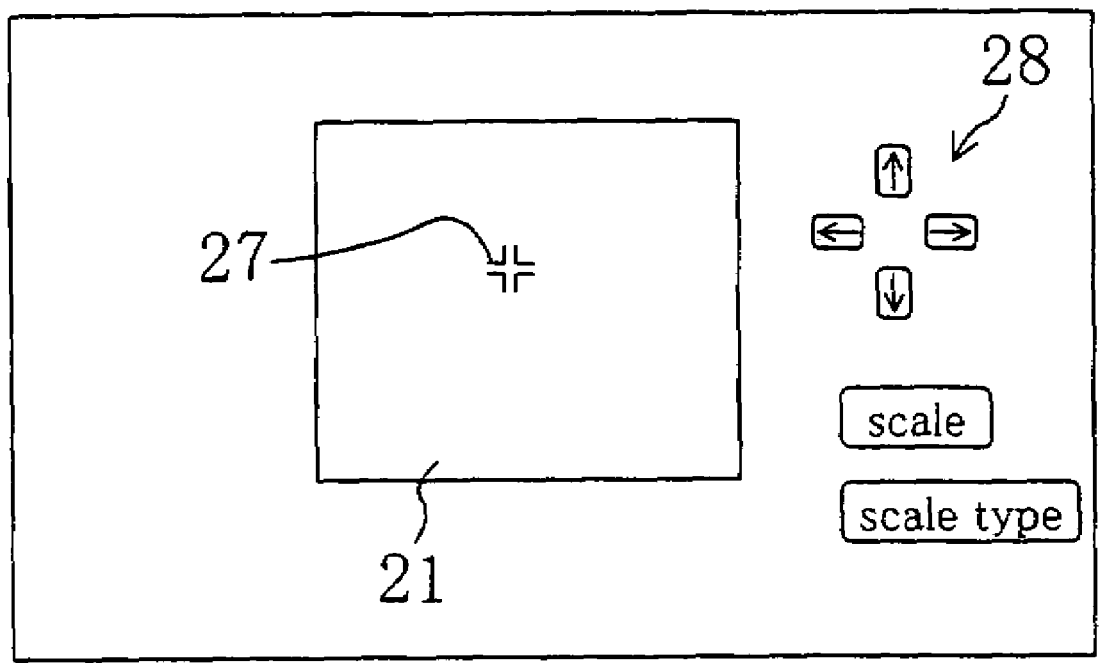
FIG. 4 is a plan view illustrating the back of a camera equipped with cursor keys.

In the first embodiment, the specified position C is supposed to be selected using the touch panel 22. Alternatively, a penlike pointing device, allowing the user to specify arbitrary coordinates on the display panel 21, may be used instead of the touch panel 22. Cursor keys, press buttons, dial or mouse, which allows the user to move a cursor on the display panel 21, may also be used. FIG. 4 is a plan view illustrating the back of the camera 1 equipped with cursor keys 28. In the example illustrated in FIG. 4, the camera 1 is so constructed as to allow the user to move a cursor 27 on the display panel 21 and thereby specify his or her desired position on the screen. In this case, the touch panel 22 is not needed and can be omitted.

Also, as another pieces of 3D positional information needed in presenting the scale image, data about the distance between the camera and the object, obtained by utilizing an auto- or manual focusing controller built in the camera, may also be used. In that case, there is no need to capture an image containing the 3D positional information or to provide the light-emitting means 16 made up of the first and second flash lamps 11a and 11b and light source controller 12. That is to say, any camera can present a scale image on the display so long as the camera includes the auto- or manual focusing controller and a normal imager that can obtain information about the distance between the camera and the object.

Specifically, the real lengths ($P_x$, $P_y$) represented by each pixel on the CCD are calculated for a distance L by the following equations:

$$P_x = L/f \cdot S_x/N_x$$

$$P_y = L/f \cdot S_y/N_y$$

where L is the distance data obtained by the auto- or manual focusing controller (i.e., the distance between the camera and the object), f is the focal length of the camera lens, $S_x$ and $S_y$ are the sizes of the CCD and $N_x$ and $N_y$ are the numbers of active pixels on the CCD. In these notations, the sub-scripts x and y denote the horizontal and vertical directions, respectively. Then, a scale image is generated based on these lengths ($P_x$, $P_y$) obtained. For example, a scale image with a length represented by a pixel number N is generated, and letters representing the real length $N_x \times P_x$ (in the x direction) or $N_y \times P_y$ (in the y direction) are presented on the screen. Alternatively, a pixel number $R/P_x$ (in the x direction) or $R/P_y$ (in the y direction) corresponding to a real length R may be obtained first. In that case, a scale image with a length represented by the pixel number may be generated and then the letters representing the length R may be presented on the screen along with the scale image.

Also, the calculation results representing sizes of the object are preferably stored on the storage medium 25 by the recording/reproducing section 24. This is because the user does not have to remember the results in that case. Furthermore, the information stored on the storage medium 25 can also be utilized conveniently by using a personal computer, for example, with functions equivalent to those of the recording/reproducing section 24. It is naturally possible to store the range image, the color image or the synthesized image obtained by combining the scale image with the color image on the storage medium 25.

Moreover, the CCD sizes, focal length of the lens during imaging and distance data of the object obtained by the auto- or manual focusing controller are preferably stored along with the image data on the storage medium 25 by the recording/reproducing section 24. In that case, even if no images are being captured, the scale image can also be read out with the image already recorded.

Figure 5:
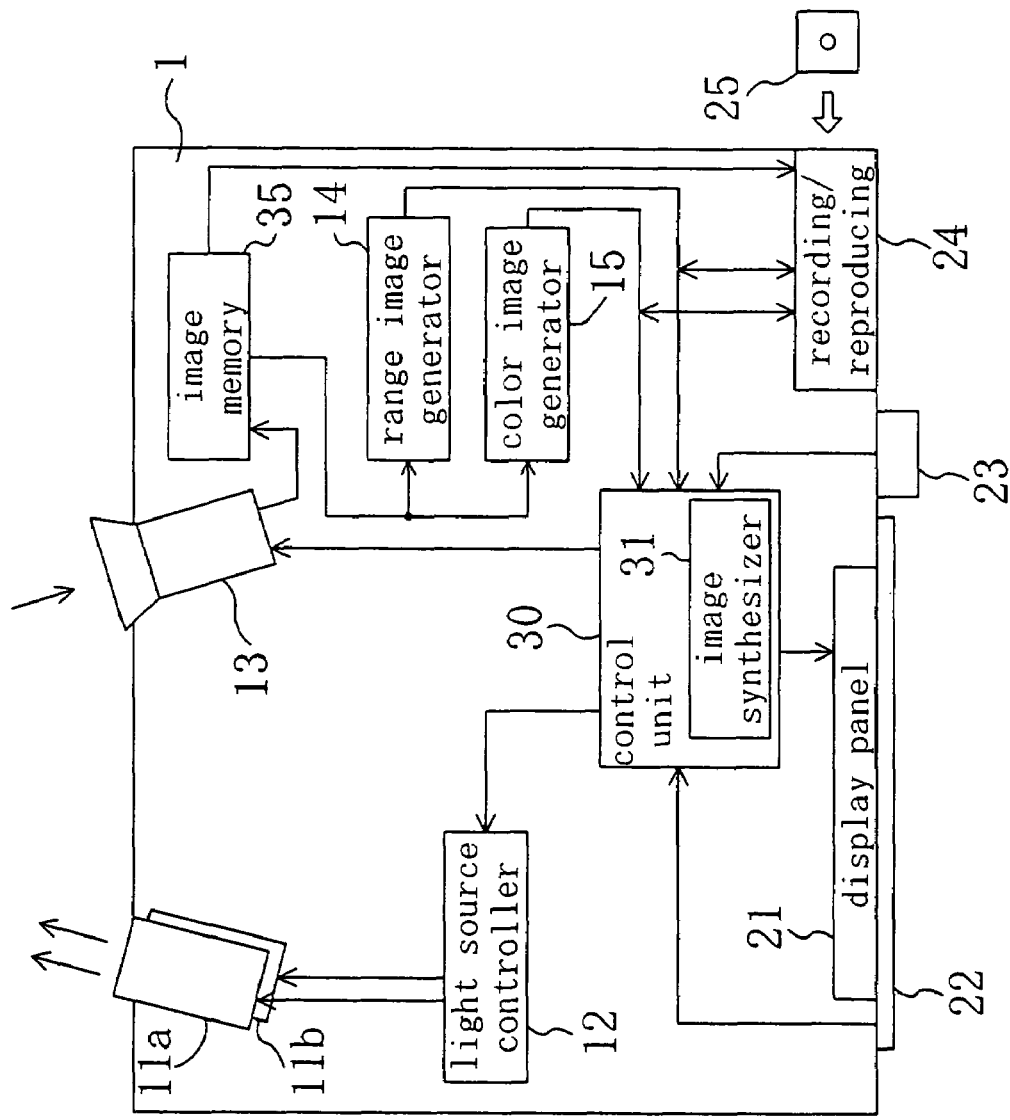
FIG. 5 is a block diagram illustrating an arrangement for a camera including an image memory.

Also, as shown in FIG. 5, an image memory 35 may be provided to temporarily store the image data, received from the imager 13, thereon. In that case, multiple pictures may be input to the camera consecutively and then recorded by the recording/reproducing section 24 on the storage medium 25 afterwards. In addition, multiple pictures may be read out from the storage medium 25 onto the image memory 35 and then presented one after another on the screen at high speeds.

It should be noted that the scale image does not have to be presented in the shape of a ruler but may be in any other shape so long as the image can be a reference picture representing a real size of an object. For example, the scale image may represent baseball bat, golf club or even a row of cartoon character face symbols. Furthermore, the user may also select his or her favorite type of scale image or change the types of scale images depending on the image to be presented.

Also, according to this embodiment, an image of an object may be presented substantially in its real size on the display panel 21 by utilizing the real size information (i.e., 3D positional information) of the object contained in the image data obtained. This is easily realizable by providing the length $P_x$ of a single pixel on the display panel 21 to the image synthesizer 31. Specifically, the number $N_p$ of on-screen pixels equivalent to a real length X is given by $$N_p = X/P_x$$

Thus, the image synthesizer 31 may scale the image up or down so that when the image is presented on the display panel 21, its number of pixels, corresponding to the real length X, becomes equal to the number $N_p$.

In the illustrated embodiment, the display panel 21 is built in the casing 1 and its size is relatively small. Accordingly, it is impossible to present an image of a big object in its real size on the panel 21. However, if an external display panel, e.g., a display for a desktop personal computer, is used, even such an image can be presented thereon in its real size. Also, the image, representing the object in its real size, may be output as a hardcopy using a printer.

Embodiment 2

A geometric measuring camera, which is an exemplary image processor according to a second embodiment of the present invention, has essentially the same configuration as that illustrated in FIGS. 1 and 2. But unlike the first embodiment, the image synthesizer 31 of the second embodiment combines a plurality of images together after at least one of the images has been scaled up or down according to a user defined size relationship. That is to say, according to the second embodiment, the range images, generated by the range image generator 14, are also used as 3D positional information. In addition, a synthesized image, obtained by combining multiple images together, is presented after at least one of the images has its/their scale(s) adjusted to meet the user defined size relationship based on the 3D positional information obtained.

Hereinafter, it will be described with reference to FIGS. 6A through 6E how the camera of the second embodiment operates in such a manner as to combine multiple images together in accordance with the user's instructions. In the illustrated example, the camera shall combine an image of a desk with an image of the user's room.

Figure 6A:
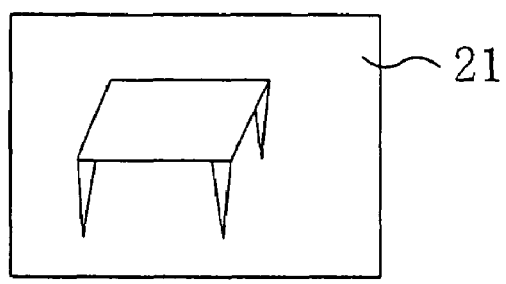
FIGS. 6A through 6E illustrate how a camera according to the second embodiment operates.

First, as shown in FIG. 6A, the user takes a picture of an object (i.e., a desk in the illustrated example) using the camera of this embodiment. Then, the user gets the image data (representing the range and color images of the desk that have been generated by the range and color image generators 14 and 15, respectively) stored on the storage medium 25 by the recording/reproducing section 24.

Figure 6D:
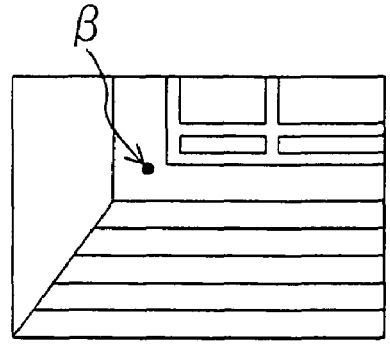
Figure 6B:
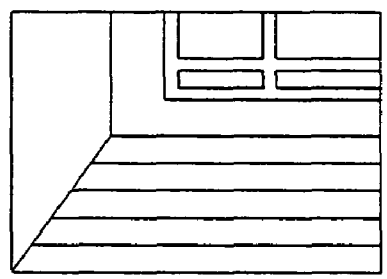

At the same time, as shown in FIG. 6B, the user also takes a picture of a room in his or her home, for example, using the camera of this embodiment. Then, the user gets the image data, representing the range and color images of the room, stored on the storage medium 25 by the recording/reproducing section 24.

Figure 6E:
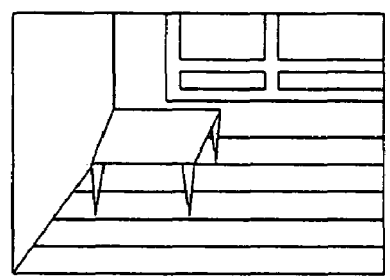
Figure 6C:
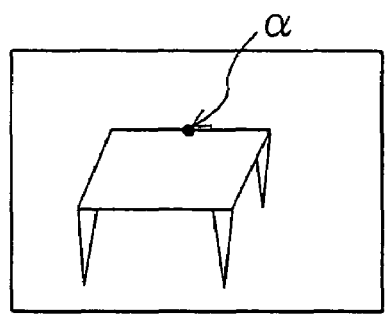

Next, as shown in FIG. 6C, the user reads out the desk image stored and gets the image separated from its background image and then presented on the display panel 21. In this case, an object image can be separated from the background image by getting presented only a portion of the captured color image that is defined by predetermined three-dimensional coordinates. In the illustrated embodiment, by using the range image, a portion of the color image, which is made up of pixels at respective locations associated with distances falling within a predetermined range from the camera, is cut out as the desk image. For example, portion of the color image with distance data of 2 meters or more as represented by the range image may be regarded as belonging to the background. In that case, only an image of the object, which is located less than 2 meter away from the camera (i.e., the desk image in this case), can be cut out.

Then, the user specifies an alignment point α on the separated desk image using the touch panel 22. In the illustrated example, the user wants to place the desk image at a room's wall image portion. Accordingly, the user defines a point α at an upper edge of the desk image as a reference point to be aligned with the room's wall image portion.

Subsequently, as shown in FIG. 6D, the user reads out the room image stored and gets the image presented on the display panel 21. Then, the user specifies another alignment point β using the touch panel 22. In the illustrated example, the user sets the point β on that image portion representing the room's wall.

Thereafter, as shown in FIG. 6E, the user combines the desk image shown in FIG. 6C with the room image shown in FIG. 6D. These images are combined together in such a manner that those two specified points α and β are located at the same position within the three-dimensional space. That is to say, a synthesized image, representing a room with a desk placed at a corner, is generated so that the point α is aligned with the point β.

In this case, however, the desk and room images were captured under mutually different conditions. Specifically, the distance between the camera and one of the objects (e.g., desk) is different from the distance between the camera and the other (e.g., room). In addition, these images were captured with the magnification of a zoom lens defined at mutually different values. Accordingly, if these images are combined together as they are, then part of the resultant synthesized image might not reflect a desired size relationship (e.g., not in proportion to their real sizes). That is to say, the scale of the desk image might be too large or too small compared to the room image in view of their desired size relationship.

Thus, according to the second embodiment, the desk and room images are combined together in such a manner that their scales are adjusted to meet the desired size relationship by using the range images. Specifically, this process includes the following processing steps.

First, the magnitude of translation (l, m, n) between the specified points α(xα, yα, zα) and β (xβ, yβ, zβ) is obtained by the following equations:

$$l = x\beta - x\alpha;$$

$$m = y\beta - y\alpha; \text{ and}$$

$$l = z\beta - z\alpha.$$

Next, each of the pixels, making up the desk image shown in FIG. 6C, is translated three-dimensionally by the magnitude (l, m, n) to its associated point on a plane containing the specified point β. Supposing a point $P_1$ with a set of three-dimensional coordinates should be translated to another point $P_2$ with a different set of three-dimensional coordinates, the points $P_1$ and $P_2$ are represented as:

$P_1 = [x1 y1 z1 1]$ and $P_2 = [x2 y2 z2 1]$, respectively.

And the point $P_2$ is given by the following equation $$P_2 = P_1 \cdot \begin{bmatrix} 1 & 0 & 0 & 0 \\ 0 & 1 & 0 & 0 \\ 0 & 0 & 1 & 0 \\ l & m & n & 1 \end{bmatrix}$$

Figure 7:
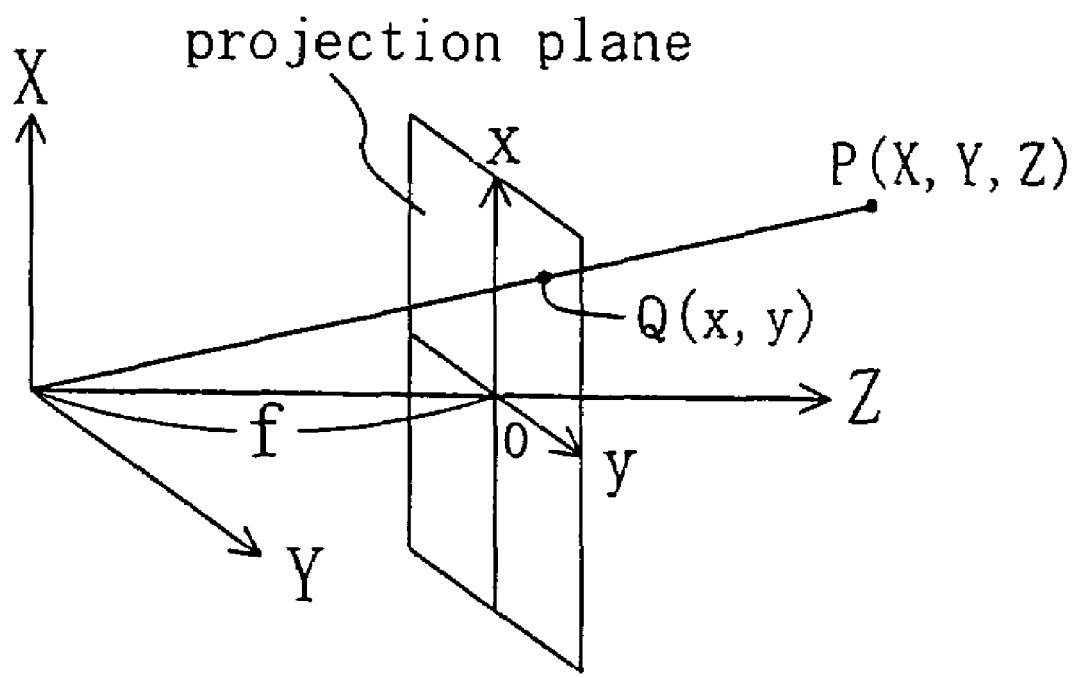
FIG. 7 illustrates perspective transformation.
Figure 8:
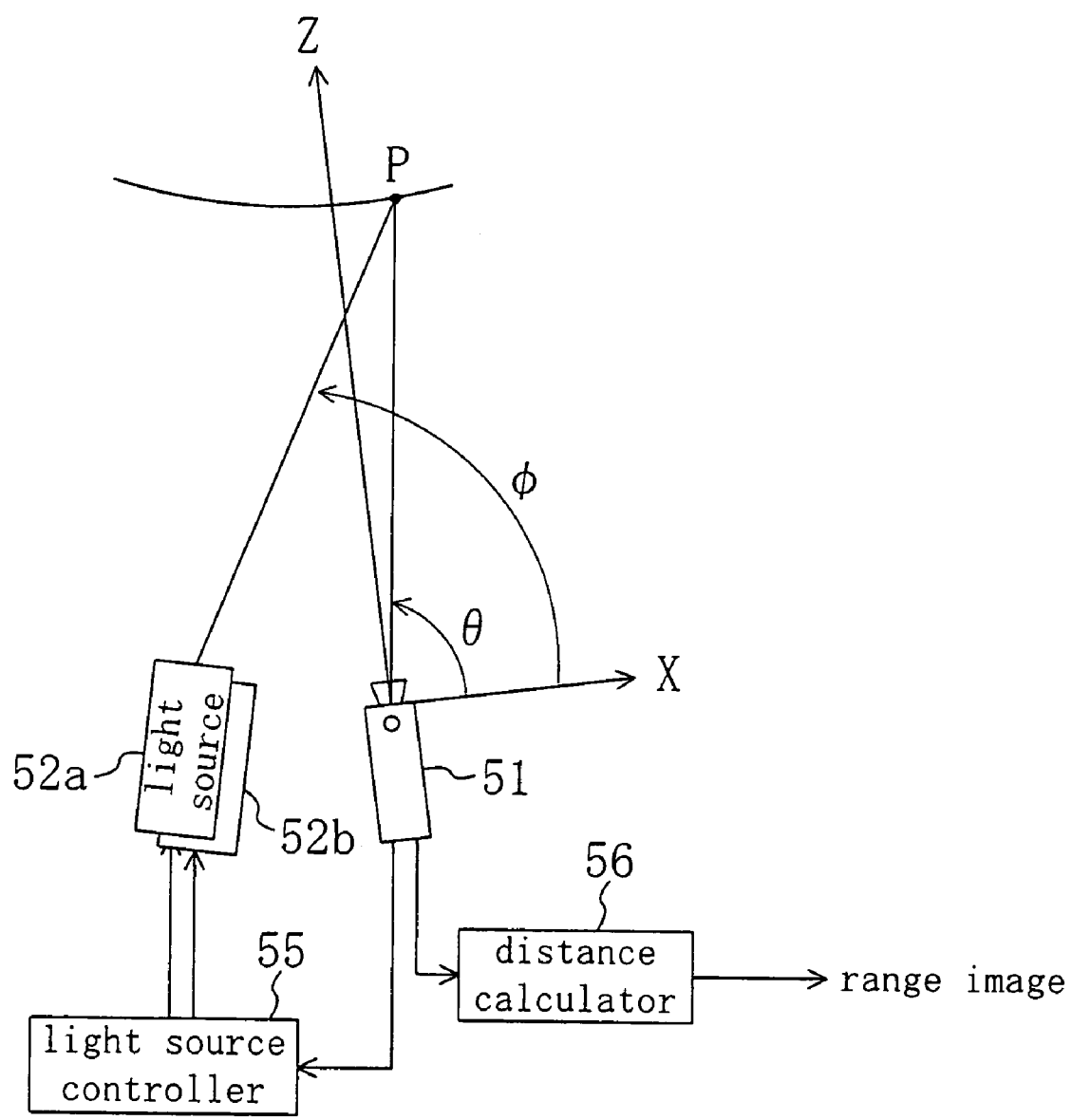
FIG. 8 illustrates a basic arrangement for a rangefinder that can capture a range image.
Figure 9B:
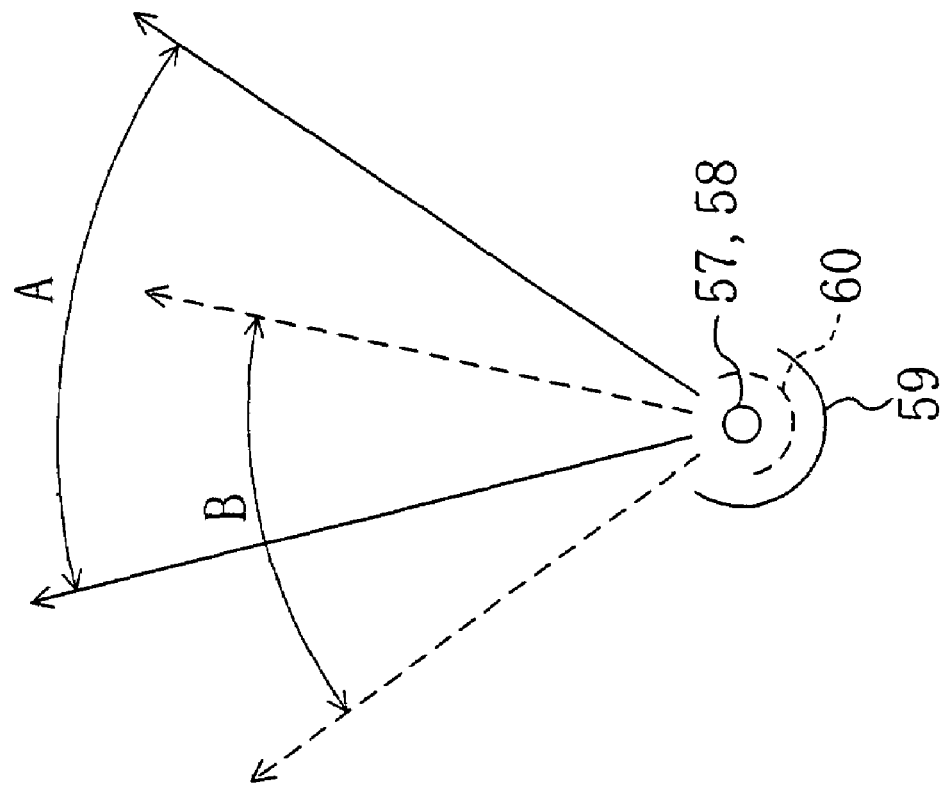
FIGS. 9A and 9B are respectively perspective view and plan view illustrating the light sources shown in FIG. 8.
Figure 9A:
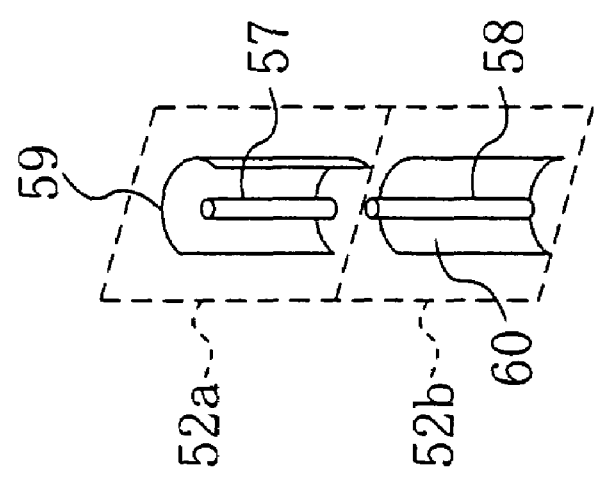
Figure 10:
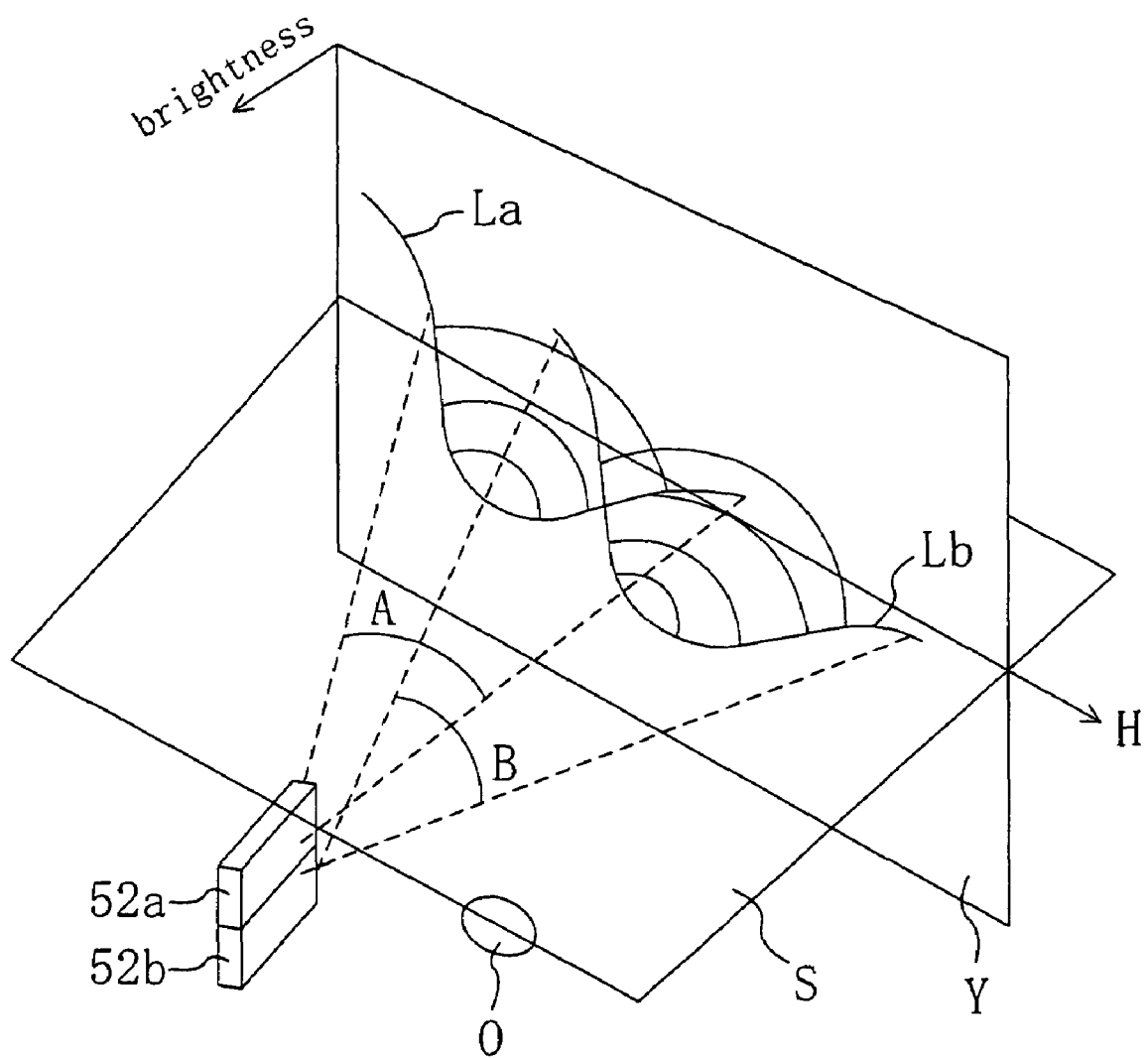
FIG. 10 illustrates light patterns formed by the light sources shown in FIGS. 9A and 9B.

Next, a two-dimensional desk image to be presented on the panel is derived from the three-dimensional coordinates of the translated desk image through perspective transformation. In transforming a point P with three-dimensional coordinates (X, Y, Z) onto another point Q with two-dimensional coordinates (x, y) on a projective plane as shown in FIG. 7, these two-dimensional coordinates are given by $x = f \cdot X/Z$ and $y = f \cdot Y/Z$ where f is the focal length of the camera. If the desk and room images were captured at mutually different zooming magnifications, then these images should preferably be scaled up or down so that these images are presented at the same magnification. That is to say, projective transformation needs to be carried out in such a manner as to equalize the f values in the above equations with each other.

Thereafter, a texture of the desk surface is extracted from the color image and then mapped onto the resultant desk image.

As a result of this process, the desk image is combined with the room image after their scales have been matched to each other as shown in FIG. 6E. An image synthesis process like this is performed by the image synthesizer 31. In this manner, according to this embodiment, a separated object image can be combined with a different background image after at least one of the images has its/their scale(s) adjusted to meet a desired size relationship even if these images were captured at mutually different distances or zooming magnifications. Accordingly, in a resultant synthesized image, the object (i.e., the desk in the illustrated example) looks like as if the object had been imaged at a place (i.e., the room shown in FIG. 6B) different from the place where it was actually imaged.

The alignment points α and β are supposed to be freely specified by the user. Thus, as a result of the image synthesis, a non-realistic image, in which the image components are placed at impossible positions, might be generated. For example, a leg of the desk might sink into the floor of the room or the upper surface of the desk might force itself into a wall of the room in such an image. Accordingly, in view of these potential unfavorable situations, the relative positions of these images to be combined are preferably made definable or modifiable externally. For instance, the camera may be constructed so that the user can move the images using the touch panel 22 or a switch provided on the back of the camera.

For example, if a desk leg has sunk into the floor, then the user should manually specify the magnitude of translation toward the top of the screen. In accordance with the user's instructions, the image synthesizer 31 translates the desk image upward, combines the translated desk image with the room image again and then gets the resultant synthesized image presented on the display panel 21. In this manner, the user repeatedly specifies the magnitude of translation while checking back the synthesized image on the screen until the desk image is placed at a most satisfactory position.

In the foregoing embodiment, the perspective transformation is supposed to be carried out for respective points on the desk image. Alternatively, these images may also be combined by an approximation method. For example, according to a method, the distance between the point α and the camera and the distance between the point β and the camera may be obtained from the range images and a two-dimensional scaling process may be performed with a ratio of these distances regarded as the magnification of the desk image.

Also, in the foregoing embodiment, at least one of the images is transformed so that their scales are matched to each other according to desired size specifications. Optionally, the user may intentionally change the scale of one of these images so that the image will be out of proportion on purpose. In that case, the image may be scaled up or down two-dimensionally. Or the object images may be scaled up or down three-dimensionally based on the 3D data of the images and then a resultant synthesized image may be obtained through perspective transformation. In other words, the image synthesizer 31 may combine multiple images together in such a manner as to meet a desired size relationship. As used herein, "combining images to meet a desired size relationship" includes combining the images together after at least one of the image(s) has/have been scaled up or down according to a substantially actual size relationship as described above.

That is to say, the image synthesizer 31 is so constructed as to up- or downscale at least one of multiple images to be combined. In this case, the scaling process may be performed through the following three-dimensional transformation. The images to be scaled up or down have the specified points represented as:

$P_1 = [x1 y1 z1 1]$ and $P_2 = [x2 y2 z2 1]$, respectively.

And the point $P_2$ is given by the following equation $$P_2 = P_1 \cdot \begin{bmatrix} kx & 0 & 0 & 0 \\ 0 & ky & 0 & 0 \\ 0 & 0 & kz & 0 \\ 0 & 0 & 0 & 1 \end{bmatrix}$$

In this manner, the user can arbitrarily scale up or down the image of a particular object. Thus, a miniaturized synthesized image can be obtained, for example.

Also, if the camera tilted during imaging, then the resultant object image (i.e., the desk image in the illustrated example) might also tilt. In that situation, the desk image should preferably be combined with the room image after the upper surface of the desk image has been parallelized to the floor of the room image by subjecting the desk image to rotational transformation. To realize the rotational transformation like this, the 4×4 matrix in above equation may be replaced with a matrix given by the following Equation:

$$\begin{bmatrix} 1 & 0 & 0 & 0 \\ 0 & 1 & 0 & 0 \\ 0 & 0 & 1 & 0 \\ -l & -m & -n & 1 \end{bmatrix} [R] \begin{bmatrix} 1 & 0 & 0 & 0 \\ 0 & 1 & 0 & 0 \\ 0 & 0 & 1 & 0 \\ l & m & n & 1 \end{bmatrix}$$

$$R = \begin{bmatrix} n_x^2 + (1-n_x^2)\cos\theta & n_z n_y(1-\cos\theta) + n_z \sin\theta & n_x n_x(1-\cos\theta) - n_y \sin\theta & 0 \\ n_x n_y(1-\cos\theta) - n_z \sin\theta & n_y^2 + (1-n_y^2)\cos\theta & n_y n_z(1-\cos\theta) + n_x \sin\theta & 0 \\ n_x n_z(1-\cos\theta) + n_y \sin\theta & n_y n_z(1-\cos\theta) - n_x \sin\theta & n_z^2 + (1-n_z^2)\cos\theta & 0 \\ 0 & 0 & 0 & 1 \end{bmatrix}$$

where R is a rotational matrix. By using this matrix, the image is rotated by θ degrees around the axis passing the origin and a point (l, m, n). Also, $n_x$, $n_y$ and $n_z$ are specified as follows:

$n_x = \cos\alpha$ $n_y = \cos\beta$ and $n_z = \cos\gamma$ where α, β and γ are angles formed by the axis of rotation with the x-, y- and z-axes, respectively. In a special situation where the image has been rotated around the x-axis, $n_x = 1$ and $n_y = n_z = 0$ Or if the image has been rotated around the y-axis, then $n_x = n_z = 0$ and $n_y = 1$ Or if the image has been rotated around the z-axis, then $n_x = n_y = 0$ and $n_z = 1$ By setting $n_x$, $n_y$ and $n_z$ to these values, the rotational matrix R can be modified into a simple form.

Also, as another pieces of 3D positional information needed in matching the scales of multiple images to each other, data about the distance between the camera and an object, obtained by the auto- or manual focusing controller built in the camera, may also be used. In that case, there is no need to capture an image containing the 3D positional information or to provide the light-emitting means 16 made up of the first and second flash lamps 11a and 11b and light source controller 12. That is to say, any camera can approximately match the scales of the images to each other so long as the camera includes the auto- or manual focusing controller and a normal imager that can obtain information about the distance between the camera and an object.

In the foregoing embodiment, the image is a natural image to be taken with a camera. Alternatively, the image may also be a synthesized image formed by a computer graphics process.

Also, in the second embodiment, two types of images, i.e., the desk and room images, are combined. However, according to the present invention, three or more types of images can also be combined together with their scales matched according to desired size specifications if the above process is performed on each of these images. In that case, images of multiple objects, which were actually captured against mutually different backgrounds, can be combined together on a common background image with their scales matched to each other.

In the second embodiment, the alignment points α and β are supposed to be specified using the touch panel 22. Alternatively, a penlike pointing device, allowing the user to specify arbitrary coordinates on the display panel 21, may be used instead of the touch panel 22. Cursor keys, press buttons, dial or mouse, which allows the user to move a cursor on the display panel 21 as shown in FIG. 4, may also be used. Then, the touch panel 22 is not needed and can be omitted.

Moreover, the CCD sizes, focal length of the lens during imaging and distance data of the objects obtained by the auto- or manual focusing controller are preferably stored, along with the image data, on the storage medium 25 by the recording/reproducing section 24. In that case, even if no images are being captured, images can also be combined in an arbitrary manner while the images are being presented on the screen.

Also, the light-emitting means 16 is removable. Accordingly, the camera may be used with the section 16 attached thereto when range images should be captured. And the camera may be used with the light-emitting means 16 removed therefrom when normal images should be captured. However, the light-emitting means 16 may naturally be fixed to the camera.

Furthermore, in the first and second embodiments, the present invention has been described as being applied to a geometric measuring camera capturing a range image (i.e., depth image) by imaging a part of the light that has been projected from the light-emitting means 16 and then reflected off from the object. Alternatively, the present invention is also easily implementable even with a camera utilizing any other depth measuring method. For example, the present invention is applicable to triangulation in which images captured by two horizontally arranged cameras are matched stereoscopically. Or the present invention is also applicable to a method of measuring the time of flight of a laser spot beam that has been projected to sequentially scan a space with time. This is because a depth image can be obtained in each of these alternative applications. In short, so long as two-dimensional images and range information can be obtained, the present invention is applicable to any camera no matter how the camera collects the range information.

Furthermore, the application of the present invention is not necessarily limited to cameras. Specifically, the present invention is also implementable as an image processor with no imaging section (e.g., a personal computer) if the apparatus can execute the same function as that performed by the image synthesizer 31. In that case, responsive to a color image and image data (e.g., range image) containing 3D positional information, the image processor either presents a scale image or combine multiple images together with their scales matched through the same process as that exemplified in the first or second embodiment. Examples of means for inputting user's instructions include mouse, keyboard, track ball, switch and volume.

It should be noted that part or all of the functions of the inventive image processor may be implemented using either dedicated hardware or software that includes a program to be executed by a computer. Also, the program, getting the functions of the inventive processor executed by a computer either partially or fully, may be recorded on a computer-readable storage medium so that the computer can execute the program recorded on the storage medium.

Figure 11:
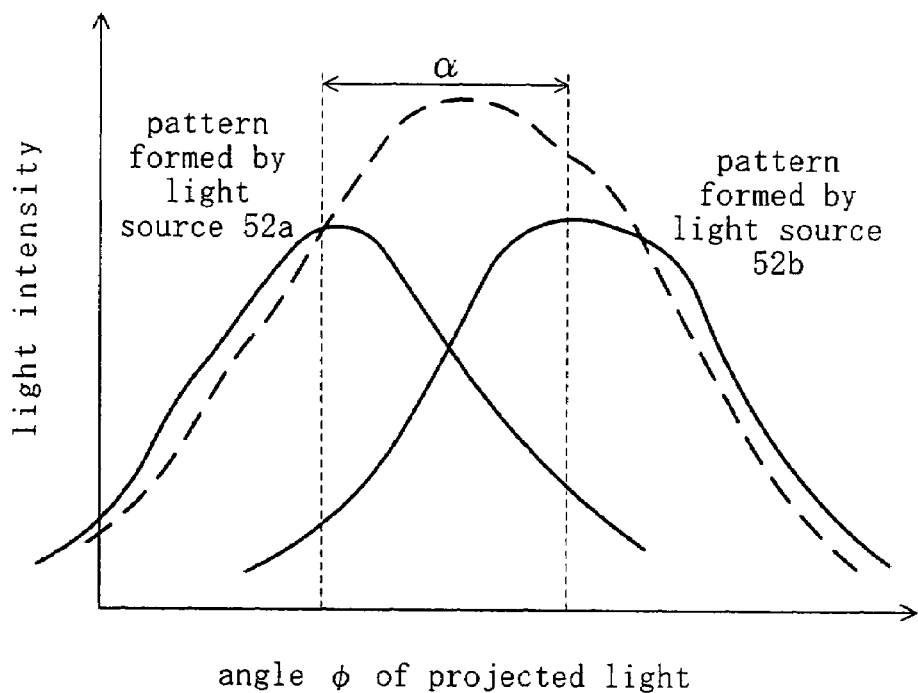
FIG. 11 is a graph illustrating a relationship between the light intensity and the angle of projected light for the light patterns shown in FIG. 10.
Figure 12:
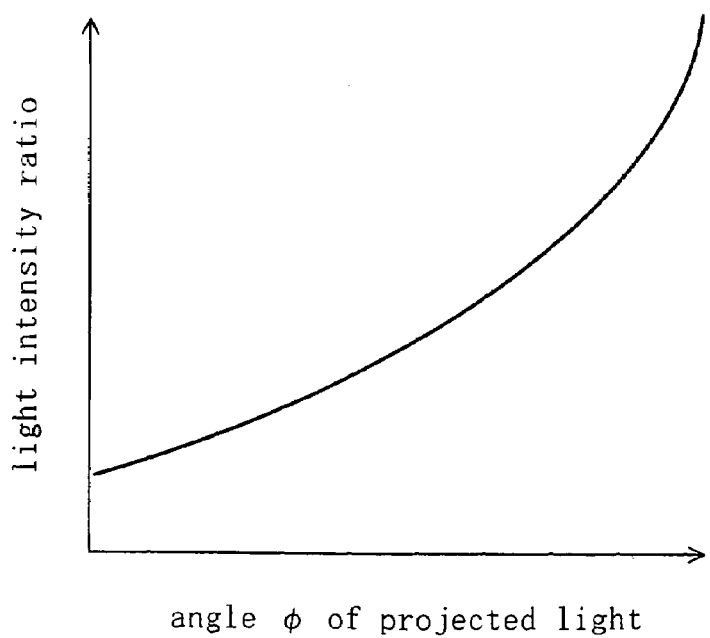
FIG. 12 is a graph illustrating a relationship between the intensity ratio and the angle of projected light for the range α shown in FIG. 11.
Figure 13:
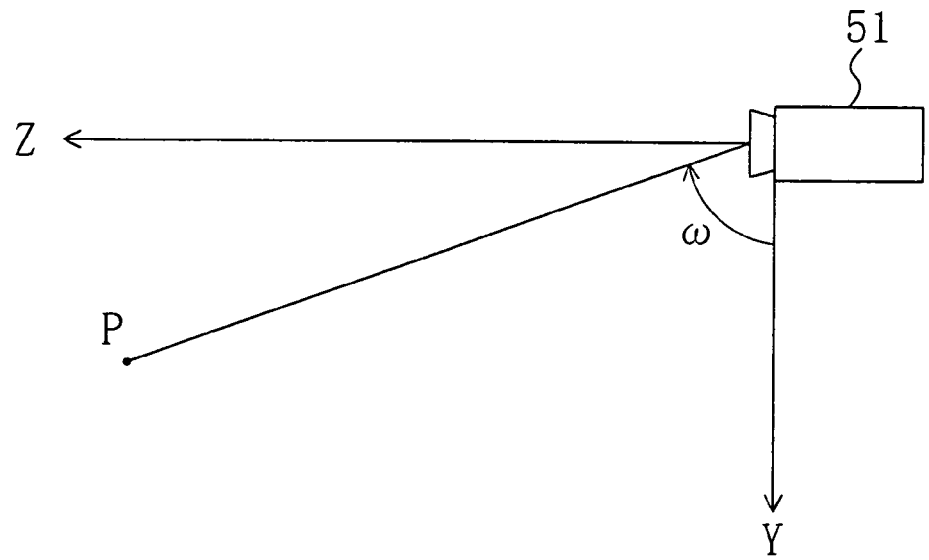
FIG. 13 schematically illustrates the concept of an angle ω used for obtaining 3D coordinates (X, Y, Z).

In the foregoing embodiments, the geometric measuring camera shown in FIG. 1 is supposed to take a still picture. However, even if the camera can take a moving picture, the present invention is implementable in a similar manner. In that case, a light source that can project two different types of light patterns onto an object alternately and successively as shown in FIG. 11 should be used though. A light source like this is implementable as a pair of flash lamps that flash alternately and successively. Alternatively, a laser beam, emitted from a semiconductor laser diode, may be shaped into a linear beam through a rod lens and then have its intensity modulated while making the linear beam sweep the object using a galvanic mirror, for example. It should be noted that if moving pictures of objects have been taken, then those images may be naturally combined or presented as they are. In addition, it is also possible to process a still picture contained in the moving picture and then combine the still picture processed with the moving picture.

Application to Image Processing Services

In the foregoing embodiments, the functions of imaging, image generation, image synthesis and presentation are all implemented within the casing 1 of the camera. In other words, the camera is supposed to realize all of these functions by itself. However, according to the present invention, the same effects are also attainable even if these functions are realized by discrete units with data exchanged between these units. That is to say, such an embodiment of the present invention realizes novel image processing services.

Figure 14:
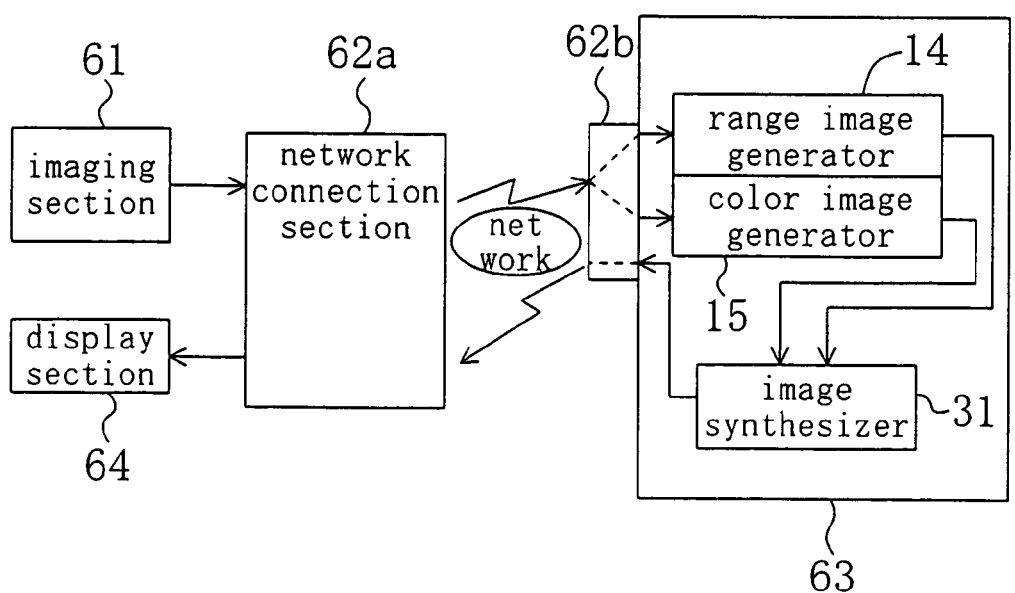
FIG. 14 is a block diagram schematically illustrating image processing services according to the present invention.

FIG. 14 is a block diagram illustrating the basic concept of the inventive image processing services. In FIG. 14, an imaging section 61 includes the light sources 11a and 11b, light source controller 12, imager 13, shutter release 23 and control unit 30 shown in FIG. 1. First, the user of these services takes a picture of an object using the imaging section 61. In this case, the picture taken should be an image containing 3D positional information or at least information from which the 3D positional information can be drawn. Then, the user sends out the image, along with his or her desired mode of processing or desired specific type of data processed, to a process service server 63 through a network connection section 62a, thereby submitting a request for image processing to the administrator of the server 63. In this case, the mode of processing means a specific processing method such as 3D extract operation or computer graphics (CG) data computation. The specific type of data processed means a specific type of output data like 3D CG data or 3D stereoscopic image data.

In this manner, the administrator accepts the image processing request via the network connection section 62a and the network. Then, the administrator gets range and color images generated from the image data, which the user has obtained using the imaging section 61 and then sent out through the network connection section 62a, by the range and color image generators 14 and 15, respectively. Next, the administrator makes the image synthesizer 31 perform the image processing on the image in the specified mode (or so that the specified type of data can be obtained through the processing) while taking the size of the object image received into account. And the administrator sends out the resultant image data to the user via the network. In response, the user checks the received image data on a display section 64.

In this case, the image processing services to be provided may take any of various forms utilizing the 3D positional information, e.g., presentation of a scale image or combination of multiple images as described for the foregoing embodiments. Also, not just the image data transmitted from the user, but also any other image data may be used for combination. For example, the image data of one of well-known objects (e.g., celebrities) that have been stored in advance in the storage of the process service server 63 may be combined with the image data received from the user.

In this case, the user should pay the charge for the process services to the administrator. The charge may be either transferred in cash to the server administrator's bank account or paid from the user to the administrator by way of a credit card company.

In the illustrated example, the image data is supposed to be exchanged via a network. Alternatively, if the image data is stored on a storage medium, the image data can be delivered to the administrator either by post or at his or her shop.

Application to Customization

Also, by utilizing the technique of combining images together using the geometric measuring camera shown in FIG. 1 to meet a desired size relationship as in the second embodiment, a method of processing an order for a product in accordance with the real size information of the product is implementable.

Figure 15:
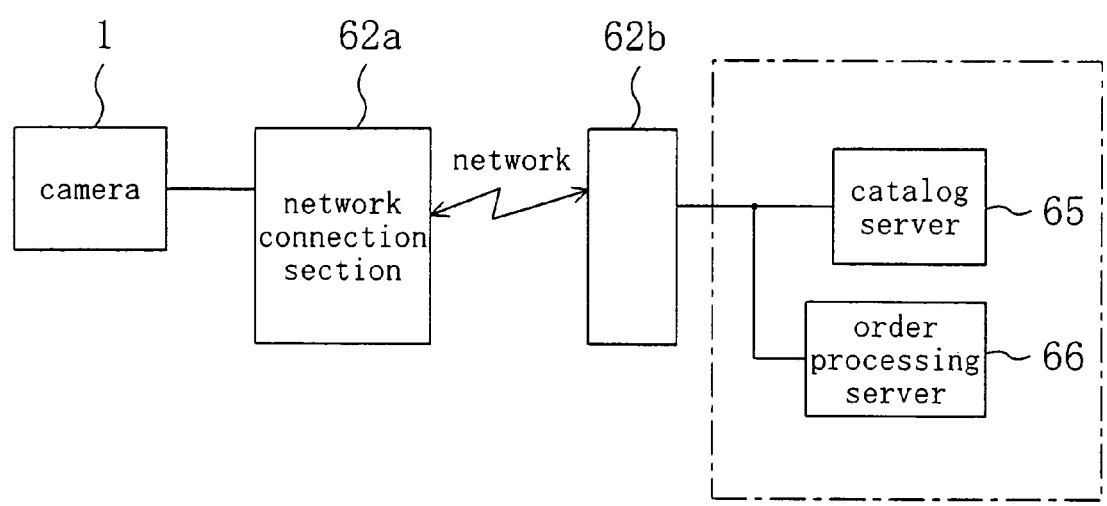
FIG. 15 is a block diagram schematically illustrating a system for implementing an order processing method according to the present invention.

In the following example, it will be described with reference to FIG. 15 how to fill an order for a customization on a wristwatch. As shown in FIG. 15, a product catalog server 65 is connected to a network. The server 65 includes a database on which the 3D structural information, color image information and price information of various products are stored.

First, the user takes a picture of his or her wrist using the geometric measuring camera 1. Next, the user accesses the product catalog server 65 via the network, checks a product catalog using a browser and selects a wristwatch of his or her desired design. In response, the server 65 sends an image of the wristwatch of the specified type, containing the 3D positional information thereof, to the user. Then, the user gets the received watch image combined with the wrist image by the image synthesizer 31 of the camera 1 according to the actual size relationship as described for the second embodiment. As a result, a virtual image, representing the wristwatch strapped on the user's wrist, is presented on the display panel 21.

Watching the image on the panel 21, the user determines whether the design or size of the wristwatch fits in with his or her wrist. And if the user likes it, he or she submits an order for the product to an order processing server 66 via the network.

In this case, if the product is customizable, then the user may select his or her most preferred size of the product by scaling up or down the watch image presented on the panel 21 using switches, for example. That is to say, in accordance with the user's instructions, the image synthesizer 31 identifies the real size of the wristwatch to be ordered based on the magnification selected. In this manner, the user may place his or her order, along with its real size information, with the order processing server 66. Thus the customization is easily realizable over the net. Furthermore, not only the wristwatch as a whole but also respective parts (e.g., the dial plate, strap and winding knob) of the watch may have their images up- or downscaled independently. In that case, the user may select parts that will fit in with his or her wrist best and may place an order for a wristwatch made up of those parts according to his or her preference. Alternatively, the 3D structural data of the parts may be stored in advance on the catalog server 65. Then, the user may combine the images of his or her favorite parts together, present an image of a wristwatch of his or her customized design on the display panel 21 and then place a personalized order for the watch with its parts, color, size, etc. specified. The charge for this order may be paid by any of currently available paying methods. For example, the charge may be paid by credit card, transferred to a specified bank account or paid when the user receives the product.

An order processing method like this is naturally applicable to customization on any other product, not just wristwatches. As an example, it will be briefly described how to customize a piece of furniture (e.g., a desk). First, the user takes a picture of a room in his or her home using the geometric measuring camera 1. Next, the user accesses the catalog server 65 via the network, views a product catalog using a browser and selects a desk of his or her desired specifications. Then, the user gets the desk image combined with the room image by the image synthesizer 31 according to the actual size relationship as shown in FIG. 6E. As a result, a virtual image, representing a room with a desk, is presented on the display panel 21. Watching the image on the panel 21, the user may freely change the scale or position of the desk using switches. And when the user places an order, he or she should send the product ID number of the desk preferred and the magnification selected or the real size information of the desk to the order processing server 66.

In the foregoing description, the size of a product is supposed to be freely selectable by the user. Alternatively, several different sizes may be prepared for a single product on the receiving end so that the user may select his or her favorite size from these. In that case, the product is not totally customizable but can be of just a limited number of sizes. Thus, the seller can cut down on the costs of developing products.

As is apparent from the foregoing description, a scale image, representing a real size of an object, is combined with an original image to generate and present a synthesized image according to the present invention. Thus, on looking at the image presented, the user can know the real size of the object imaged. In addition, according to the present invention, multiple images can be combined together with their scales adjusted in accordance with desired size specifications (e.g., according to an actual size relationship). Accordingly, the user can quickly watch a virtual image of an object against a different background, for example.

What is claimed is:

1. An image processor comprising:
   a display which presents an image of an object thereon; and
   an image synthesizer which generates a scale image, representing a substantially real size, at a position specified on the image presented on the display in accordance with three-dimensional positional information of the object and for combining the scale image with the image of the object,
   wherein a synthesized image, obtained by combining the scale image with the object image, is presented on the display.

2. The processor of claim 1, further comprising:
   an imaging section which captures the object image containing the three-dimensional positional information; and
   a range image generator which draws the three-dimensional positional information from the image captured by the imaging section,
   wherein the image synthesizer generates the scale image in accordance with the three-dimensional positional information obtained by the range image generator.

3. The processor of claim 2, wherein the imaging section comprises a light-emitting device that projects light with a predetermined radiation pattern onto the object and captures the object image containing the three-dimensional positional information by receiving part of the light that has been projected onto, and then reflected from, the object.

4. The processor of claim 1, further comprising an imaging section having an automatic or manual focusing controller,
   wherein the image synthesizer generates the scale image by using data, which represents a distance of the object and is obtained by the automatic or manual focusing controller, as the three-dimensional positional information.

5. The processor of claim 1, wherein the scale image represents a shape of a ruler.

6. The processor of claim 1, further comprising an input device that is so constructed as to allow a user to externally input the specified position.

7. The processor of claim 6, wherein the input device is a touch panel formed on the surface of the display.

8. The processor of claim 6, wherein the input device is a penlike pointing device that is so constructed as to allow the user to specify arbitrary coordinates on the surface of the display.

9. The processor of claim 6, wherein the input device is a cursor key, mouse or press button that allows the user to move a cursor presented on the display and to specify coordinates of the cursor.

10. The image processor of claim 1, wherein the image synthesizer calculates the real size of the object based on the image of the object.

11. The processor of claim 1, wherein the scale image and the image of the object are combined in accordance with the three-dimensional positional information of the object.

12. An image processor comprising:
    a display which presents an image of an object thereon; and
    an image synthesizer which combines respective images of multiple objects together in accordance with three-dimensional positional information of the objects so that at least one of the object images is scaled up or down according to a desired size relationship,
    wherein a synthesized image, obtained by combining the multiple images together, is presented on the display.

13. The processor of claim 12, wherein the image synthesizer combines the image of one of the objects, which has been separated from a background image, with another background image.

14. The processor of claim 13, wherein the image synthesizer cuts out an image portion, which is made up of pixels at respective locations associated with distances falling within a predetermined range, as the separated object image from the image.

15. The processor of claim 12, further comprising:
    an imaging section which captures the object images containing the three-dimensional positional information; and
    a range image generator for drawing the three-dimensional positional information from the images captured by the imaging section,
    wherein the image synthesizer combines the images together in accordance with the three-dimensional positional information obtained by the range image generator.

16. The processor of claim 15, wherein the imaging section comprises a light-emitting device that projects light with a predetermined radiation pattern onto the at least one object and captures the object image containing the three-dimensional positional information by receiving part of the light that has been projected onto, and then reflected from, the object.

17. The processor of claim 12, further comprising an imaging section having an automatic or manual focusing controller,
   wherein the image synthesizer combines the images together by using data, which represents distances of the objects and is obtained by the automatic or manual focusing controller, as the three-dimensional positional information.

18. The processor of claim 12, wherein the image synthesizer is so constructed as to upscale, downscale or rotate at least one of the images.

19. The processor of claim 12, which is so constructed as to allow a user to externally define or change relative positions of the images being combined.

20. The image processor of claim 12, wherein the image synthesizer calculates the real size of the object based on the image of the object.

21. The processor of claim 12, wherein the multiple images are combined in accordance with their respective three-dimensional positional information.

22. An image processor comprising
a display which presents an image of an object thereon and
an image synthesizer which generates an image, representing the object substantially in its real size when presented on the display, by scaling the image up or down in accordance with three-dimensional positional information of the object obtained from the image of the object,
wherein the image, representing the object substantially in its real size, is presented on the display.

23. An image processor comprising:
a display which presents an image of an object thereon; and
an image synthesizer which combines respective images of multiple objects together in accordance with three-dimensional positional information of the objects so that alignment points specified at the respective images coincide with each other in three-dimensional position and in such a manner as to meet a desired size relationship three-dimensionally by processing the respective images to have the same focal length,
wherein a synthesized image, obtained by combing the multiple images together is presented on the display.

24. The processor of claim 23, wherein the multiple images are combined in accordance with their respective three-dimensional positional information.

* * * * *